United States Patent
Saida et al.

[11] Patent Number: 6,076,232
[45] Date of Patent: Jun. 20, 2000

[54] HINGE STRUCTURE FOR ELECTRONIC APPARATUS

[75] Inventors: Yoshihide Saida; Shinichi Kamiya, both of Shizuoka, Japan

[73] Assignee: NEC Corporation, Tokyo, Japan

[21] Appl. No.: 09/088,614

[22] Filed: Jun. 1, 1998

[30] Foreign Application Priority Data

May 30, 1997 [JP] Japan .................................. 9-142710

[51] Int. Cl.[7] .................................................. E05D 11/08
[52] U.S. Cl. .............................................. 16/342; 16/337
[58] Field of Search ............................. 16/342, 330, 337, 16/339, 341

[56] References Cited

U.S. PATENT DOCUMENTS

| | | | |
|---|---|---|---|
| 4,186,905 | 2/1980 | Brudy | 16/342 |
| 5,333,365 | 8/1994 | Katagiri | 16/340 |
| 5,566,048 | 10/1996 | Esterberg et al. | 16/342 |
| 5,652,694 | 7/1997 | Martin | 16/342 |
| 5,697,124 | 12/1997 | Jung | 16/341 |
| 5,715,576 | 2/1998 | Liu | 16/342 |
| 5,749,124 | 5/1998 | Lu | 16/307 |

FOREIGN PATENT DOCUMENTS

| | | |
|---|---|---|
| 4-237315 | 8/1992 | Japan . |
| 5-88780 | 4/1993 | Japan . |
| 7-98011 | 4/1995 | Japan . |

*Primary Examiner*—Chuck Y. Mah
*Attorney, Agent, or Firm*—Scully, Scott, Murphy & Presser

[57] ABSTRACT

A hinge structure for electronic apparatus such as a word processor, a personal computer and the like having a cover is provided. The hinge structure can meet the demand for making an electronic apparatus thin and light in weight and also can reduce the manufacturing cost of the equipment. The cover can rotate about a hinge 14 with respect to the main body of the equipment and can be maintained at a desired angular position. The hinge comprises a bush 51, a first hinge section 14a and second hinge sections 14b and 14c. The bush 51 comprises a first rotary section 52 and a second rotary section 53 which is rotatably coupled to the first rotary section. When the second rotary section is rotated about the shaft 52a of the first rotary section, a frictional force generates between a concave portion 54 of the second rotary section. The first hinge section is provided at one end of the main body of the electronic apparatus to fix the first rotary section while the second hinge section is provided at one end of the cover to fix the second rotary section.

6 Claims, 3 Drawing Sheets

HINGE STRUCTURE FOR ELECTRONIC APPARATUS

BACKGROUND OF THE INVENTION

The present invention relates to a hinge structure for an electronic apparatus such as a laptop type personal computer, a word-processor, and the like.

FIG. 1 is a sectional view of one of a pair of hinges of a conventional information processing system disclosed in Japanese Unexamined Patent Publication (JP-A) No. 237315 of 1992. The pair of hinges of this information processor causes a cover having a liquid crystal display (LCD) disposed therein to be rotatably supported on a main body casing having a keyboard, CPU and etc. disposed therein.

In FIG. 1, a bush 2 made of a material having a comparatively large coefficient of friction is fitted in a central shaft 1 which supports the cover (not shown) and which is strong enough to withstand a torque applied thereon. Further, the bush 2 is covered by a cylindrical housing 3. A rotary support 4 is formed integral with the cover and is provided with a hinge receiving bore 5 at one end thereof. The housing 3 is received within the hinge receiving bore 5. A flat portion 1a formed at the top end of the central shaft 1 is inserted into, and supported by, a hole 9 of a hinge metal 8 fixed to the main body casing 6 by means of a screw 7. A rib 10 formed on the main body casing 6 supports the rotary support 4.

In the case of this information processing system, the operator may open and close the cover about a hinge so as to optionally adjust the angle of orientation of the cover while he looks at the screen of the liquid crystal display disposed within the cover.

A first drawback of the above-described conventional hinge structure resides in that in order to prevent the deformation of the hinge metal 8 for fixing the bush 2, it is necessary for the hinge metal 8 to have a sufficient size and thickness to satisfy the rigidity thereof. Accordingly, it is difficult to make the information processing system compact, thin and light in weight for the sake of portability.

A second drawback of the above-described conventional hinge structure resides in that the hinge metal 8 and the screw 7 must be used for preventing the rotation of the bush 2 and for fixing the bush 2. Consequently, the cost of parts such as the hinge metal 8 and the screw 7 and the cost of assembling these parts are needed to thereby increase the manufacturing cost.

SUMMARY OF THE INVENTION

An object of the present invention is to provide a hinge structure for an electronic apparatus which structure is capable of making the electronic apparatus compact, thin and light in weight.

Another object of the present invention is to provide a hinge structure for electronic apparatus which structure is capable of reducing the manufacturing cost of the electronic apparatus.

According to the present invention, there is provided a hinge structure for an electronic apparatus which structure is capable of rotatably supporting the cover of the electronic apparatus at a desired angle and which comprises a bush including a first rotary section and a second rotary section rotatably connected to the first rotary section so as to keep the cover at the above-mentioned desired angle by a predetermined torque, a first hinge section provided at one end of the body of the electronic apparatus and adapted to fix one of the first rotary section and the second rotary section and a second hinge section provided at one end of the cover and adapted to fix the remaining one of the first and second rotary sections.

DESCRIPTION OF THE PREFERRED EMBODIMENT

A hinge structure of an electronic apparatus according to the embodiment of the present invention will now be described with reference to the accompanying drawings.

Figure 1:
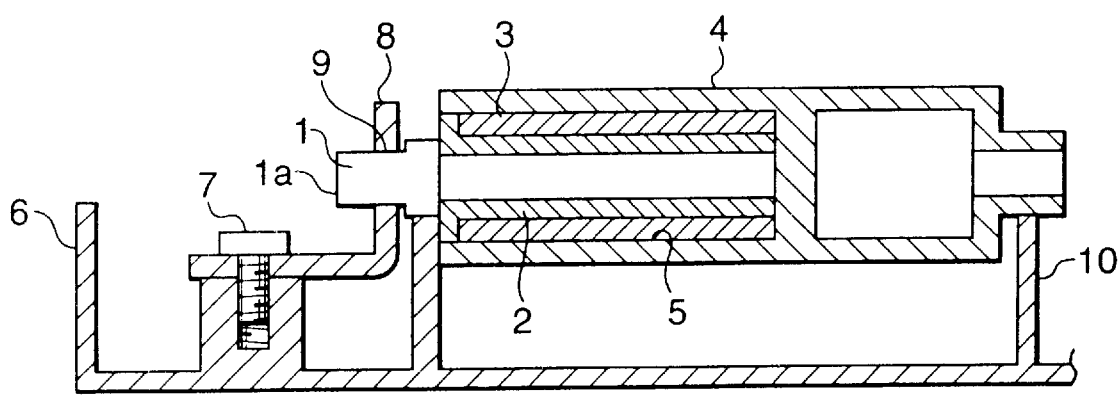
FIG. 1 is a partial sectional view of a hinge structure of a conventional information processor.
Figure 2:
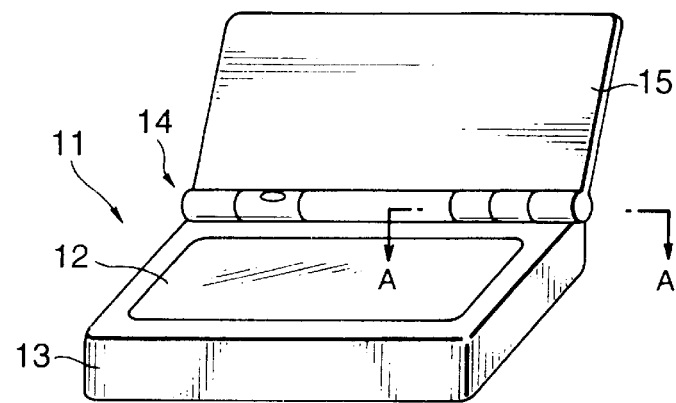
FIG. 2 is a perspective view of an electronic apparatus according to one embodiment of the present invention especially in a state in which the electronic apparatus has its cover opened.
Figure 3:
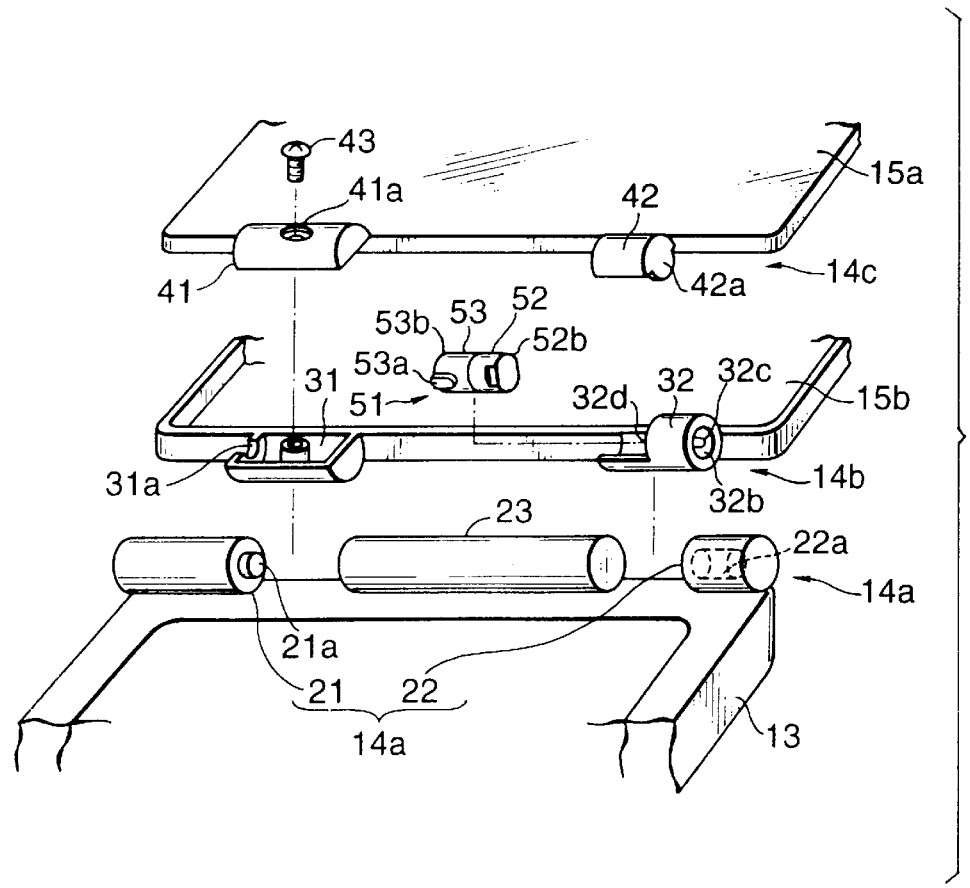
FIG. 3 is an exploded perspective view of an essential portion of the electronic apparatus shown in FIG. 2.
Figure 4:
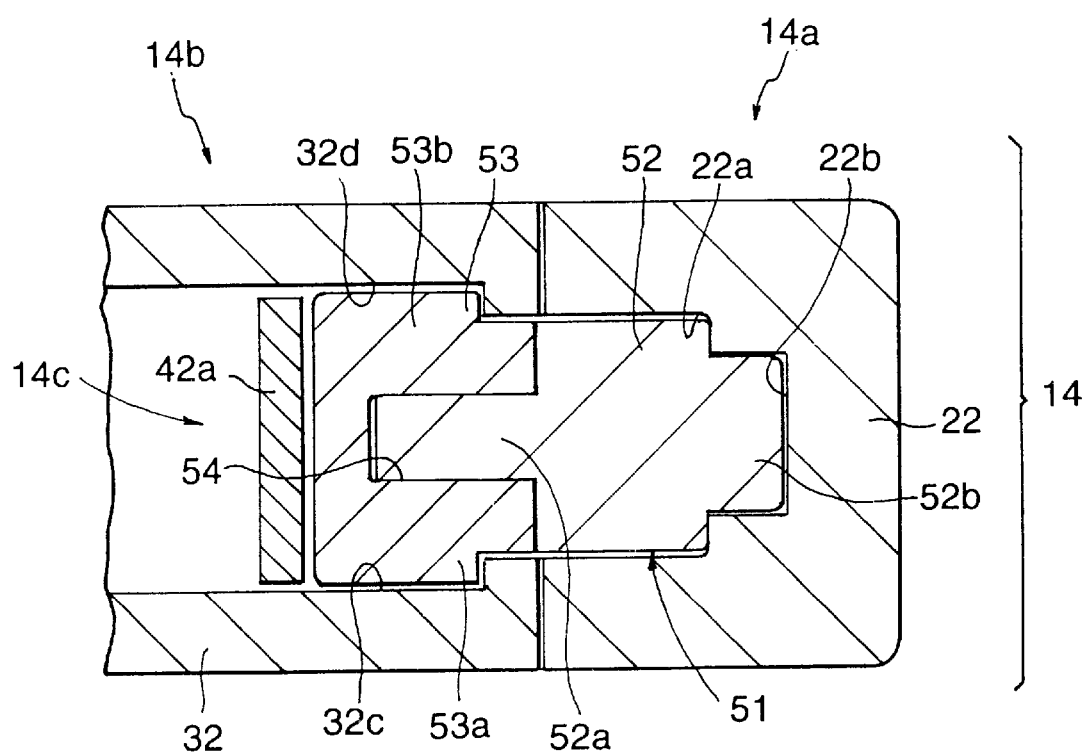
FIG. 4 is a sectional view taken along the A—A line of FIG. 2.

FIG. 2 is a perspective view of the electronic apparatus according to one embodiment of the present invention especially in a state in which a cover of the apparatus is opened, FIG. 3 is an exploded perspective view of an essential portion of the electronic apparatus and FIG. 4 is a sectional view taken along the A—A line of FIG. 2.

In FIG. 2, the electronic apparatus 11 comprises a main body 13 provided with a display section 12 such as a liquid crystal display (LCD) and a cover 15 connected to one end of the main body 13 through a hinge 14 and capable of rotation about the hinge 14 as a fulcrum.

As shown in FIG. 3, the cover 15 comprises an upper casing 15a and a lower casing 15b which are placed one above another and is electrically connected to the main body 13 of the electronic apparatus. Further, within the cover 15, there are disposed a printed wiring board which mounts various kinds of parts therein and the like (in FIG. 3, such printed wiring board and electrical connecting structure of parts are omitted).

A hinge section 14a (a first hinge section) formed integral with one end of the upper surface of the main body 13 and forming part of a hinge 14 comprises a cylindrical convex element 21 shown at the left side, and a cylindrical concave member 22 shown at the right side, in FIG. 3. Further, between the convex element 21 and the concave element 22 there is arranged a cylindrical element 23 serving as a spacer when second hinge sections 14b and 14c (to be described later) are fixed to the first hinge section 14a. The convex element 21 has a projection 21a at the center of an inner end surface thereof and the concave element 22 has a concave portion 22a at the center of the inner end surface thereof with the portion 22a having a groove 22b at the bottom thereof.

On the other hand, the hinge section (a second hinge section) 14b formed integral with one end of the lower casing 15b and forming part of the hinge 14 comprises a semi-cylindrical concave element 31 shown at the left side, and a cylindrical member 32 shown at the right side, in FIG. 3. The concave element 31 is provided with a hole 31a which fits with the convex portion 21a of the convex member 21. The cylindrical member 32 includes an inner semi-cylindrical portion and an outer cylindrical portion of the same length and the outer cylindrical portion is provided with a hole 32b having grooves 32c and 32d along the axis thereof.

Further, the hinge section (a second hinge section) 14c formed integral with one end of the upper casing 15a and forming part of the hinge 14 comprises a semi-cylindrical concave member 41 shown at the left side, and a semicircular concave portion 42 shown at the right side, in FIG. 3. At the central portion of the concave element 41, there is formed a screw-threaded hole 41a and outside the concave element 42, there is provided a disk-shaped support plate 42a. Further, the concave element 41 and the concave element 31 are fixed together by means of a screw 43.

A bush 51 comprises a first rotary section 52 and a second rotary section 53 rotatably connected to the first rotary section 52 capable of being retained at a desired angle due to a predetermined torque. The first rotary section 52 has a concentric shaft 52a on one of its end surfaces and a convex portion 52b of a large width on the other end surface thereof. Further, the second rotary section 53 has in the cylindrical portion thereof a concave portion 54 to fit with the concentric shaft 52a and a pair of convex portions (projections) 53a and 53b are formed on the outer peripheral surface of the second rotary section 53 in symmetrical relationship with each other.

In the case of the above-described hinge structure, the convex portion 21a of the convex element 21 of the main body 13 of the apparatus is mounted in the hole 31a of the concave element 31, then the right-side hole 32b of the cylindrical element 32 is caused to coincide with the circular entrance of the concave element 22 and in this condition, the bush 51 is pressure-fitted into the hole 32b from on the left side. In this case, the convex portions 53a and 53b are made to coincide with the grooves 32c and 32d, respectively, so that the second rotary section 53 of the bush 51 forming the convex portions 53a and 53b is held fixed to the lower casing 15b without getting rotated and at the same time, the first rotary section 52 of the bush 51 is firmly fixed to the main body 13 of the apparatus.

After the above process, the concave element 31 of the lower casing 15b is caused to fit with the convex element 21 of the main body 13 of the apparatus and then the upper casing 15a and the lower casing 15b are connected together with the screw 43 or by means of a snap-fit structure (not shown). In this case, since the bush 51 is prevented from moving in the horizontal direction by the support plate 42a, it is arranged at its predetermined position.

Further, when the second rotary section 53 is rotated about the shaft 52a of the first rotary section 52, the concave portion 54 of the second rotary section 53 comes into frictional contact with the shaft 52a. Accordingly, the second rotary section 53 can rotate to a desired angular position with respect to the first rotary section 52 due to a predetermined torque.

Further, since the convex portion 52b of the bush 51 is fixed to the groove 22b of the concave element 22, the first rotary section 52 is fixed to the main body 13 of the apparatus. At the same time, the convex portions 53a and 53b of the bush 51 are fixed to the grooves 32c and 32d of the cylindrical element 32, respectively, and the second rotary section 53 is fixed to the cover 15 while it is prevented from moving in the horizontal direction by the support plate 42a.

In FIGS. 2 and 4, when the cover 15 is opened and closed, the second rotary section 53 of the bush 51 within the hinge 14 rotates with the opening and closing of the cover 15 but since the first rotary section 52 is fixed to the main body 13 of the apparatus, a predetermined frictional force generates between the second rotary section 53 and the first rotary section 52 so that the cover 15 can be opened and closed by a predetermined force and can be maintained at a desired angular position, which results in improving the expediency for the operator to handle the apparatus.

The present invention produces the following effects.

1. The hinge metals and screws which have hitherto been used are no more required. Accordingly, it is possible to make the target electronic apparatus compact, thin and light in weight. Further, since the cost of parts such as the hinge metals and screws and the cost of assembling the parts can be saved, the manufacturing cost for fixing the bush can be reduced and as a result, it is possible to provide an electronic product at a low manufacturing cost.

2. Since the first rotary section or the second rotary section of the bush is fixed to the first hinge section or the second hinge section, it is possible to prevent the idle rotation of the bush.

3. Since the support plate for preventing the axial movement of the bush is provided within the concave portion of the first hinge section or in the hole of the second hinge section, it is possible to arrange the bush securely.

What is claimed is:

1. A hinge adapted for use with an electronic apparatus for rotatably connecting a main body to a cover of said electronic apparatus, the hinge comprises:

a bush including a first rotary section and a second rotary section rotatably coupled to said first rotary section for retaining said cover at a desired angle due to frictional contact between said first and second rotary sections upon the application of a relative rotational movement between said cover and said main body;

a first hinge section adapted to be attached to one end of said main body wherein said first rotary section is fixed to said first hinge section; and a second hinge section adapted to be attached to one end of said cover wherein said second rotary section is fixed to said second hinge section, said first and second hinge sections rotatably cooperating to form the hinge;

wherein said first rotary section is cylindrical and provided with a coaxial shaft on one end surface thereof and said second rotary section is cylindrical and provided with a concave portion on one end surface thereof so that said shaft of said first rotary section fits with said concave portion of said second rotary section.

2. The hinge as claimed in claim 1, wherein said first hinge section is provided with a concave portion for fixing said first rotary section and said second hinge section is provided with a hole adapted to fix said second rotary section.

3. The hinge as claimed in claim 2, wherein a connection of said first rotary section with said concave portion of said first hinge section is made through engagement of a convex portion formed on said first rotary section with a groove formed on said first hinge section and a connection of said second rotary section with the hole of said second hinge section is made through engagement of a convex portion formed on said second rotary section with a groove formed in the hole of said second hinge section.

4. The hinge as claimed in claim 2, wherein said cover comprises a combination of an upper casing and a lower casing which are laid one above another and fixed together by means of a screw.

5. The hinge as claimed in claim 3, wherein said cover comprises a combination of an upper casing and a lower casing which are laid one above another and fixed together by means of a screw.

6. The hinge as claimed in claim 4 or 5, wherein one of the upper or lower casings further has a support plate, the support plate being disposed within the hole of said second hinge section when said upper and lower casings are fixed together to prevent axial movement of said bush in the hole.

* * * * *